(12) United States Patent
Montero et al.

(10) Patent No.: US 11,659,078 B2
(45) Date of Patent: May 23, 2023

(54) PRESENTATION OF COMMUNICATIONS

(71) Applicant: Sorenson IP Holdings, LLC, Salt Lake City, UT (US)

(72) Inventors: Adam Montero, Midvale, UT (US); Ji Liang, Millcreek, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 302 days.

(21) Appl. No.: 17/074,277

(22) Filed: Oct. 19, 2020

(65) Prior Publication Data

US 2022/0124193 A1    Apr. 21, 2022

(51) Int. Cl.
*H04M 1/72478* (2021.01)
*G10L 13/02* (2013.01)
*G10L 15/26* (2006.01)
*H04M 1/247* (2021.01)

(52) U.S. Cl.
CPC ......... *H04M 1/72478* (2021.01); *G10L 13/02* (2013.01); *G10L 15/26* (2013.01); *H04M 1/2475* (2013.01); *H04M 2201/40* (2013.01)

(58) Field of Classification Search
CPC ............. H04M 1/645; H04M 1/72478; H04M 1/2475; H04M 1/651; H04M 2201/39; H04M 2201/40; H04M 3/4239; H04M 2203/252; H04M 2203/305; G10L 13/02; G10L 15/26; G10L 13/00
See application file for complete search history.

(56) References Cited

U.S. PATENT DOCUMENTS

| | | | |
|---|---|---|---|
| 5,995,590 A | 11/1999 | Brunet et al. | |
| 6,504,910 B1* | 1/2003 | Engelke | H04M 7/006 |
| | | | 379/93.08 |
| 7,440,889 B1 | 10/2008 | Skiena et al. | |
| 9,336,689 B2 | 5/2016 | Romriell et al. | |
| 9,917,939 B1* | 3/2018 | Stimpson | H04M 3/42391 |
| 2005/0048992 A1 | 3/2005 | Wu et al. | |
| 2013/0058270 A1 | 3/2013 | Cha et al. | |
| 2013/0072237 A1 | 3/2013 | Ramdeo | |
| 2015/0130887 A1* | 5/2015 | Thelin | H04N 7/025 |
| | | | 348/14.03 |

FOREIGN PATENT DOCUMENTS

| | | |
|---|---|---|
| DE | 10239812 A1 | 3/2004 |
| JP | 2003092628 A | 3/2003 |
| KR | 20040026338 A | 3/2004 |
| KR | 20140006198 A | 1/2014 |
| TW | 200807394 A | 2/2008 |

* cited by examiner

*Primary Examiner* — Yuwen Pan
*Assistant Examiner* — Angelica Perez
(74) *Attorney, Agent, or Firm* — Maschoff Brennan

(57) ABSTRACT

A method to present communications may include captioning, by a human assistant during a call between a first user using a first captioning telephone device and a second user using a second telephone device, words spoken by the second user into the second telephone device. The method may also include presenting the captioned words on a first display of the first captioning telephone device, receiving text typed into the second telephone device by the second user, and presenting the received text on the first display of the first captioning telephone device.

20 Claims, 5 Drawing Sheets

PRESENTATION OF COMMUNICATIONS

FIELD

The embodiments discussed in the present disclosure are related to presentation of communications.

BACKGROUND

Transcriptions of audio communications may assist people that are hearing-impaired to participate in the audio communications. To provide the transcriptions to a hearing-impaired person, a hearing-impaired user may participate in a captioning communication session with a hearing user in which a human assistant transcribes words spoken by the hearing user. In this manner, the hearing-impaired user may listen to the words spoken by the hearing user as well as read captions of the words spoken by the hearing user.

The subject matter claimed herein is not limited to embodiments that solve any disadvantages or that operate only in environments such as those described above. Rather, this background is only provided to illustrate one example technology area where some embodiments described herein may be practiced.

SUMMARY

According to one or more aspects of the present disclosure, a method to present communications may include captioning, by a human assistant during a call between a first user using a first captioning telephone device and a second user using a second telephone device, words spoken by the second user into the second telephone device. The method may also include presenting the captioned words on a first display of the first captioning telephone device, receiving text typed into the second telephone device by the second user, and presenting the received text on the first display of the first captioning telephone device.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments in this disclosure relate to systems and methods that may be configured to present communications. For example, in some embodiments, a hearing-impaired user may participate in a captioning communication session with a hearing user in which a human assistant transcribes words spoken by the hearing user. In this manner, the hearing-impaired user may listen to the words spoken by the hearing user as well as read captions of the words spoken by the hearing user.

One problem with the transcription of words spoken by a hearing user during a captioning communication session may involve miscommunication due to the hearing user not speaking words clearly or due to the spoken words being difficult to understand. For example, where the hearing user is speaking English, but English is not the hearing user's native language, it may be difficult for the hearing-impaired user and for the human assistant to understand the English words spoken by the hearing user (or other non-English words spoken by the hearing user), which may make it difficult for the human assistant to accurately transcribe the words spoken by the hearing user for use by the hearing-impaired user.

In some embodiments, during a call between a hearing-impaired user using a captioning telephone device and a hearing user using a telephone device, the hearing-impaired user may be presented with captions, on a display of the captioning telephone device, of the words spoken by the hearing user. In addition, the hearing-impaired user may be presented, on the display of the captioning telephone device, with text typed into the second telephone device by the hearing user. In this manner, the hearing user may have the option to either speak words that will be captioned for the hearing-impaired user or type words that will be presented to the hearing-impaired user, thus avoiding miscommunication by enabling words that may be difficult to speak clearly or that may be difficult to understand (for the hearing-impaired user and/or for the human assistant) to alternatively or additionally be precisely typed by the hearing user and presented to the hearing-impaired user.

Figure 1:
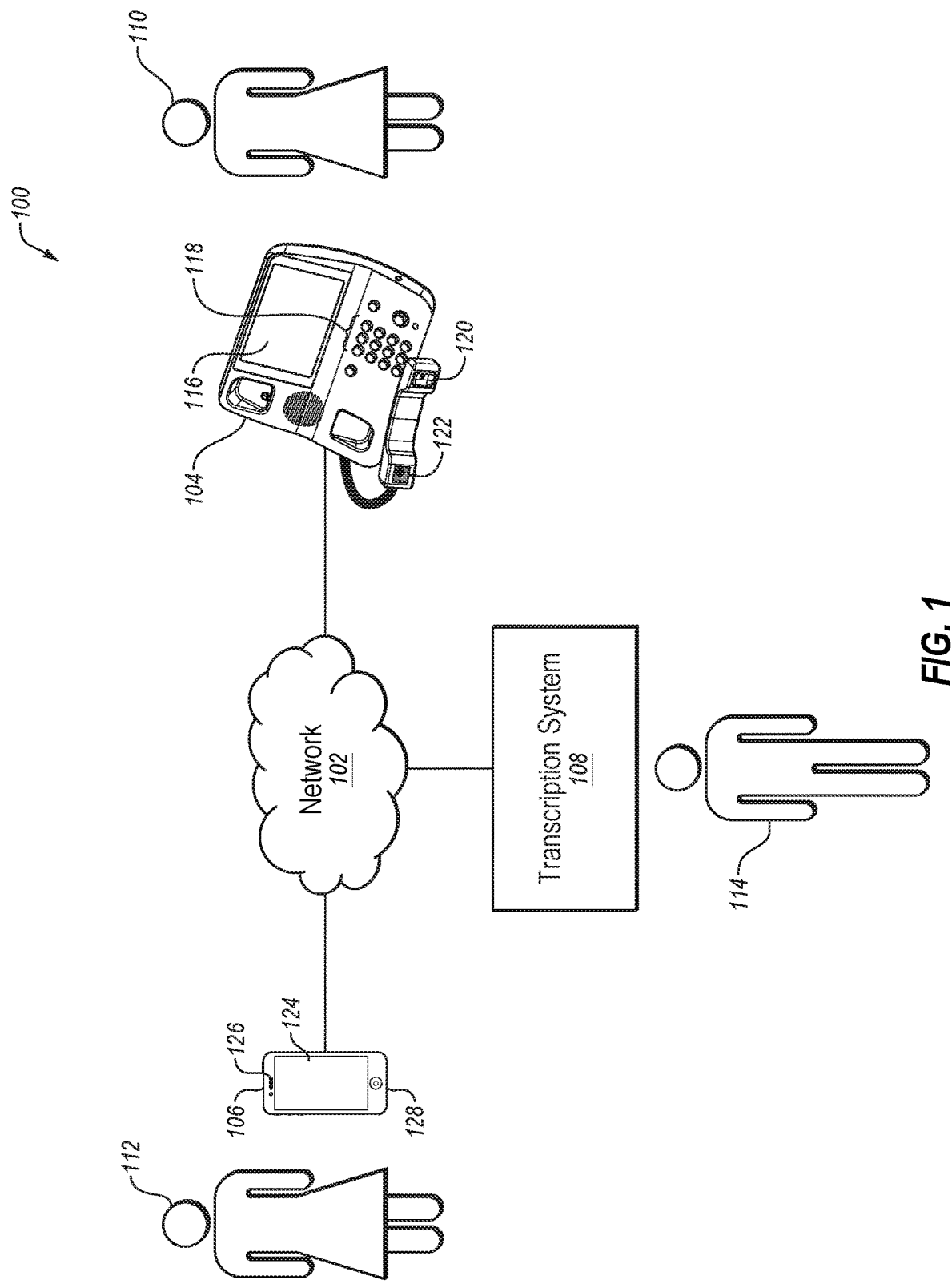
FIG. 1 illustrates an example environment for presentation of communications.

Turning to the figures, FIG. 1 illustrates an example environment 100 for presentation of communications. The environment 100 may be arranged in accordance with at least one embodiment described in the present disclosure. The environment 100 may include a network 102, a first device 104, a second device 106, and a transcription system 108.

The network 102 may be configured to communicatively couple the first device 104, the second device 106, and the transcription system 108. In some embodiments, the network 102 may be any network or configuration of networks configured to send and receive communications between systems and devices. In some embodiments, the network 102 may include a wired network, an optical network, and/or a wireless network, and may have numerous different configurations, including multiple different types of networks, network connections, and protocols to communicatively couple devices and systems in the environment 100. In some embodiments, the network 102 may also be coupled to or may include portions of a telecommunications network, including telephone lines, for sending data in a variety of different communication protocols, such as a plain old telephone system (POTS).

Each of the first and second devices 104 and 106 may be any electronic or digital computing device. For example, each of the first and second devices 104 and 106 may include a desktop computer, a laptop computer, a smartphone, a mobile phone, a tablet computer, a telephone, a phone console, a caption device, a captioning telephone device, a dual-tone multi-frequency signaling (DTMF) telephone device, a voice-over Internet protocol (VOIP) telephone device, or any other computing device that may be used for communication between a hearing-impaired user 110 using the first device 104 and a hearing user 112 using the second device 106.

In some embodiments, each of the first and second devices 104 and 106 may include memory and at least one processor, which are configured to perform operations as described in this disclosure, among other operations. In some embodiments, each of the first and second devices 104 and 106 may include computer-readable instructions that are configured to be executed by each of the first and second devices 104 and 106 to perform operations described in this disclosure, among other operations.

In some embodiments, the first and second devices 104 and 106 may be configured to establish communication sessions with other devices. For example, the first device 104 may be configured to establish an outgoing communication session, such as a telephone call, video call, or other communication session, with another device over a telephone line or network. For example, the first device 104 and the second device 106 may communicate with the network 102 over a wireless cellular network, a wired Ethernet network, a wireless 802.11 network, an optical network, or a POTS line. Alternatively or additionally, each of the first device 104 and the second device 106 may communicate over other wired or wireless networks that do not include or only partially include a POTS. For example, a communication session between the first device 104 and the second device 106, such as a telephone call, may be a VoIP telephone call. As another example, the communication session between the first device 104 and the second device 106 may be a video communication session or other communication session.

Alternately or additionally, each of the first and second devices 104 and 106 may be configured to communicate with other systems over a network, such as the network 102 or another network. In these and other embodiments, each of the first device 104 and the second device 106 may receive data from and send data to the transcription system 108.

In some embodiments, the first and second devices 104 and 106 may be configured to obtain audio during a communication session. The audio may be part of a video communication or an audio communication, such as a telephone call. As used in this disclosure, the term audio may be used generically to refer to sounds that may include spoken words. Furthermore, the term "audio" may be used generically to include audio in any format, such as a digital format, an analog format, or a propagating wave format. Also, as used in this disclosure, the term video may be used generically to refer to a compilation of images that may be reproduced in a sequence to produce video.

As an example of obtaining audio, the first device 104 may be configured to obtain first audio from the hearing-impaired user 110. For example, the first device 104 may obtain the first audio from a microphone 122 of the first device 104 or from another device that is communicatively coupled to the first device 104. Similarly, the second device 106 may also be configured to obtain second audio from the hearing user 112. In some embodiments, the second device 106 may obtain the second audio from a microphone 128 of the second device 106 or from another device communicatively coupled to the second device 106. During the communication session, the first device 104 may provide the first audio to the second device 106 for broadcasting on a speaker 126 of the second device 106. Alternatively or additionally, the second device 106 may provide the second audio to the first device 104 for broadcasting on a speaker 120 of the first device 104.

In some embodiments, the transcription system 108 may include any configuration of hardware, such as processors, servers, and database servers that are networked together and configured to perform a task. For example, the transcription system 108 may include multiple computing systems, such as multiple servers that each include memory and at least one processor, which are networked together and configured to perform operations of captioning communication sessions, such as telephone calls, between devices such as the first device 104 and another device (e.g., the second device 106) as described in this disclosure. In these and other embodiments, the transcription system 108 may operate to generate transcriptions of audio of one or more parties in a communication session. For example, the transcription system 108 may generate transcriptions of audio generated by other devices and not the first device 104 or both the first device 104 and other devices, among other configurations.

In some embodiments, the transcription system 108 may operate as an exchange configured to establish communication sessions, such as telephone calls, video calls, etc., between devices such as the first device 104 and another device or devices as described in this disclosure, among other operations. In some embodiments, the transcription system 108 may include computer-readable instructions that are configured to be executed by the transcription system 108 to perform operations described in this disclosure.

Further, in some embodiments, the environment 100 may be configured to facilitate a captioning communication session between the hearing-impaired user 110 and a second user, such as the hearing user 112. As used in the present disclosure, a "hearing-impaired user" may refer to a person with diminished hearing capabilities. Hearing-impaired users often have some level of hearing ability that has usually diminished over a period of time such that the hearing-impaired user can communicate by speaking, but the hearing-impaired user may struggle in hearing and/or understanding others.

In some embodiments, the captioning communication session may be established between the first device 104 and the second device 106. In these embodiments, the first device 104 may be configured to present transcriptions of the communication session to the hearing-impaired user 110. As an example, the first device 104 may be one of the CaptionCall® 57T model family or 67T model family of captioning telephones or a device running the CaptionCall® mobile app. For example, in some embodiments, the first device 104 may include a visual display 116, such as a touchscreen visual display or other visual display, that is integral with the first device 104 and that is configured to present text transcriptions of a communication session to the hearing-impaired user 110.

Alternatively or additionally, the first device 104 may be associated with a visual display that is physically separate from the first device 104 and that is in wireless communication with the first device 104, such as a visual display of a smartphone accessible to the hearing-impaired user 110 and configured to be in Bluetooth® wireless communication with the first device 104. Other physically separate physical displays may be visual displays of desktop computers, laptop computers, mobile phones, tablet computers, or any other computing devices that are in wireless communication with the first device 104.

The first device 104 may also include the speaker 120, such as a speaker in a handset or a speaker in a speakerphone. The first device 104 may also include a processor communicatively coupled to the visual display 116 and to the speaker 120, as well as at least one non-transitory computer-readable media communicatively coupled to the processor and configured to store one or more instructions that when executed by the processor perform the methods for presentation of messages as described in this disclosure, and also store voice messages locally on the first device 104.

During a communication session, the transcription system 108, the first device 104, and the second device 106 may be communicatively coupled using networking protocols. In some embodiments, during the communication session between the first device 104 and the second device 106, the first device 104 may provide the audio received from the second device 106 to the transcription system 108. Alternatively or additionally, the second device 106 may provide the audio to the transcription system 108 and the transcription system 108 may relay the audio to the first device 104. Alternatively or additionally, video data may be provided to the transcription system 108 from the second device 106 and relayed to the first device 104.

At the transcription system 108, the audio data may be transcribed. In some embodiments, to transcribe the audio data, a transcription engine may generate a transcription of the audio. For example, the transcription system 108 may be configured to generate transcriptions of audio obtained from devices with which the transcription system 108 is associated. The transcription system 108 may be configured to generate the transcriptions of the audio in real-time or substantially real-time during a communication session and send the transcriptions to the associated devices. For example, the first device 104 may send second audio that originates from the second device 106 to the transcription system 108 during a communication session with the second device 106. The transcription system 108 may generate a transcription of the second audio and provide the transcription to the first device 104. The first device 104 may present the transcription during the communication session in real-time or substantially real-time. In some embodiments, real-time or substantially real-time may indicate that a time difference between when words are audibly broadcast by the first device 104 and corresponding words are presented in the transcription by the first device 104 may be less than five, ten, fifteen, or twenty seconds.

The transcription system 108 may generate transcriptions using a fully machine-based automatic speech recognition (ASR) process that may operate without human intervention. Alternately or additionally, the transcription system 108 may be configured to generate a transcription of audio using a revoicing process. The revoicing process may receive and broadcast audio to a human assistant 114. The human assistant 114 may listen to the broadcast and speak the words from the broadcast. The words spoken by the human assistant 114 may be captured to generate revoiced audio. The revoiced audio may be used by a speech recognition program to generate the transcription of the audio. For example, the human assistant 114 may listen to the audio received from the second device 106 at the transcription system 108 (e.g., received via the first device 104), and "revoice" the words of the hearing user 112 to a speech recognition computer program tuned to the voice of the human assistant 114. In these and other embodiments, the human assistant 114 may be an operator who serves as a human intermediary between the hearing-impaired user 110 and the hearing user 112. In some embodiments, text transcriptions may be generated by a speech recognition computer as a transcription of the audio of the hearing user 112. Alternately or additionally, the transcription system 108 may use a combination of a machine-based process and a revoicing process to generate a transcription of the audio.

After generation of the text transcriptions, the text transcriptions may be provided to the first device 104 over the network 102. The first device 104 may display the text transcriptions on the visual display 116 while the hearing-impaired user 110 carries on a normal voice conversation with the hearing user 112. The text transcriptions may allow the hearing-impaired user 110 to supplement the voice signal received from the second device 106 and confirm her understanding of the words spoken by the hearing user 112. The transcription of a communication session occurring in real-time between two devices as discussed above may be referred to in this disclosure as a captioning communication session.

In some embodiments, the transcription system 108 may be associated with one or more of the first and second devices 104 and 106. A device being associated with the transcription system 108 may indicate that the device includes credentials to allow the device to communicate with and receive transcription services from the transcription system 108. For example, a device associated with the transcription system 108 may indicate that the device may send audio to the transcription system 108 and obtain a transcription of the audio from the transcription system 108.

In addition to generating transcriptions of communication sessions, the environment 100 may be configured to provide typed text from other devices, such as the second device 106. The typed text may include any characters that may be typed into a physical or digital keypad of a device, such as alphabetic characters, numeric characters, emoji characters, or other characters. In some embodiments, during a captioning communication session, the hearing user 112 may type text into a digital keypad on the touchscreen display 124 of the second device 106, such as into a digital keypad of a captioning app running on the second device 106. This typed text may then be sent to the first device 104 and presented to the hearing-impaired user 110 on the visual display 116. Additionally or alternatively, the hearing-impaired user 110 may type text into a physical keypad 118, or into a digital keypad on the visual display 116. This typed text may then be sent to the second device 106 and presented to the hearing user 112 in the captioning app on the touchscreen display 124. Alternatively, this typed text may be converted (e.g., on the first device 104, on the second device 106, or on the transcription system 108) into audio using a text-to-speech conversion, and the audio may then be broadcast on the speaker 126 of the second device 106. In this manner, the hearing user 112 may have the option to either speak words that will be captioned for the hearing-impaired user 110 or type words that will be presented to the hearing-impaired user 110, thus avoiding miscommunication by enabling words that may be difficult to speak clearly or that may be difficult to understand (for the hearing-impaired user 110 and/or for the human assistant 114) to alternatively or additionally be precisely typed by the hearing user 112 and presented to the hearing-impaired user 110.

Modifications, additions, or omissions may be made to the environment 100 without departing from the scope of the present disclosure. For example, in some embodiments, the user 112 may be a hearing-impaired user and/or the user 110 may be a hearing user. Alternately or additionally, the transcription system 108 may provide text to the second device 106 based on audio transmitted by the first device 104. Alternately or additionally, the transcription system 108 may include additional functionality. For example, the transcription system 108 may edit the text or make other alterations to the text after presentation of the text on the first device 104. Alternately or additionally, the environment 100 may include additional devices similar to the first and second devices 104 and 106. In these and other embodiments, these additional devices may be configured to present communications as described in this disclosure.

Figure 2:
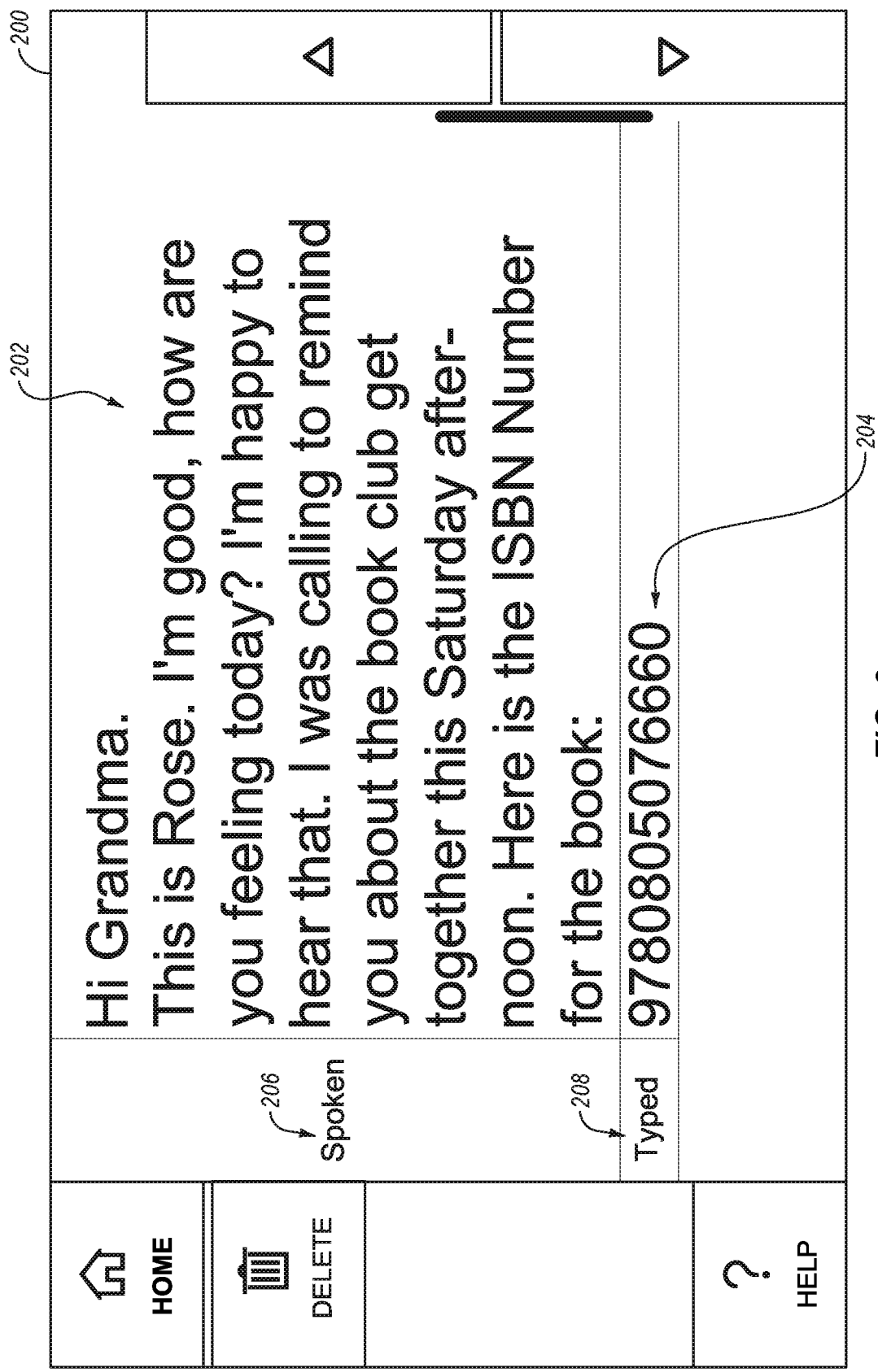
FIG. 2 illustrates an example screen that may appear on a display of a device associated with presentation of communications.

FIG. 2 illustrates an example screen 200 that may appear on a display of a device associated with presentation of communications, arranged in accordance with at least one embodiment described in the present disclosure. The screen 200 of FIG. 2 may present captioned text 202, as provided in real-time or substantially real-time by a transcription system (e.g., the transcription system 108 of FIG. 1), as well as typed text 204, as provided in real-time or substantially real-time from a user typing text into a device (e.g., the hearing user 112 typing text into the second device 106 of FIG. 1). Additionally, the captioned text 202 may be presented with an indicator 206 that indicates that the captioned words were spoken by a user (e.g., the hearing user 112 of FIG. 1), and the typed text 204 may be presented with an indicator 208 that indicates that the typed words were typed by the user. Although the indicators 206 and 208 are illustrated in FIG. 2 as text labels, it is understood that these indicators may instead be symbols, pictures, or any other indicator that allows captioned text to be distinguished from the typed text. Modifications, additions, or omissions may be made to the screen 200 without departing from the scope of the present disclosure.

Figure 3:
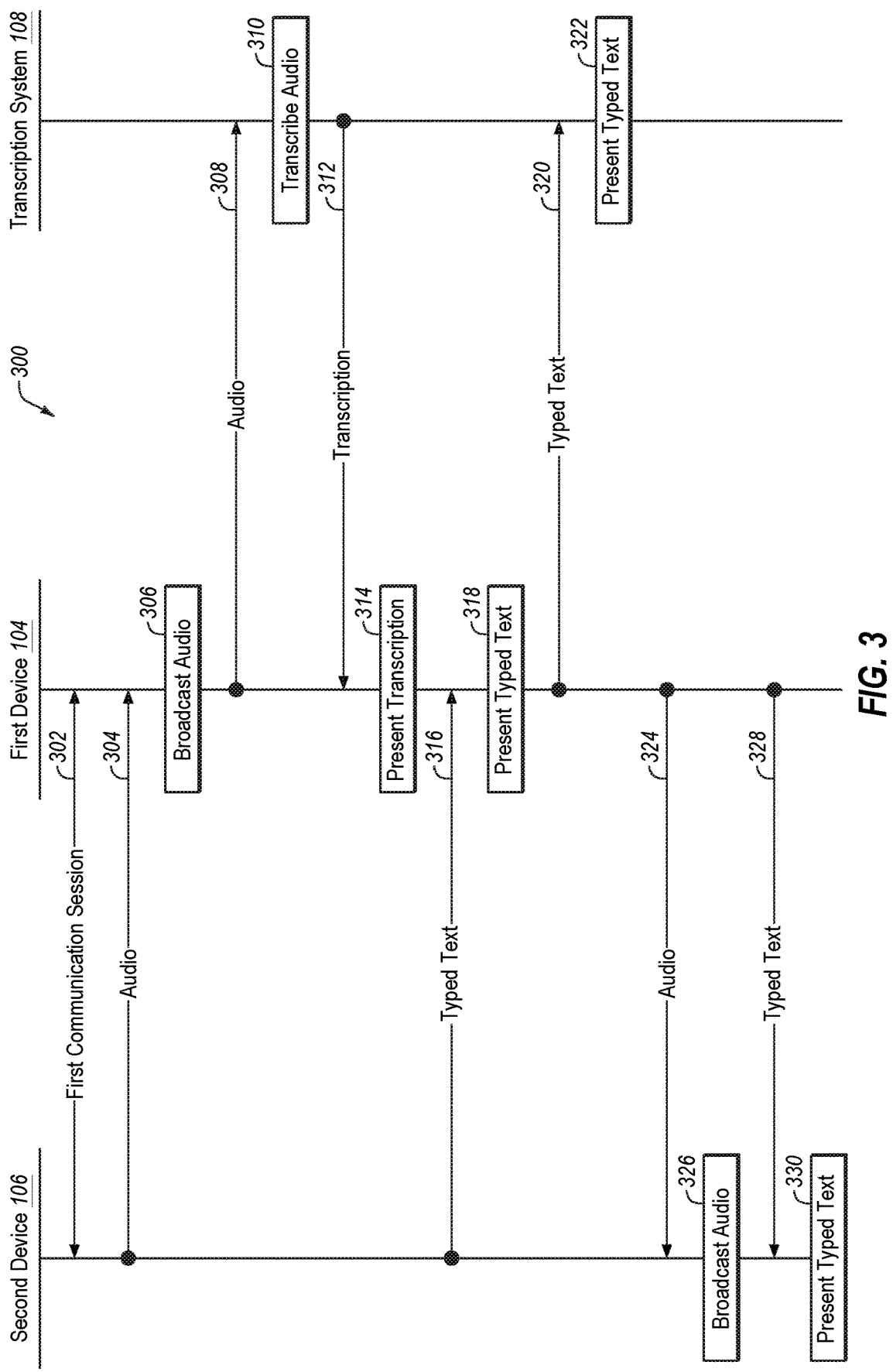
FIG. 3 illustrates example operations related to presentation of communications.

FIG. 3 illustrate example operations 300 related to presentation of communications. The operations 300 may be arranged in accordance with at least one embodiment described in the present disclosure. In the illustrated example, the operations 300 may be between the first device 104, the second device 106, and the transcription system 108 of FIG. 1. In some embodiments, the operations 300 may be an example of communications and interactions between the first device 104, the second device 106, and the transcription system 108. In some embodiments, the interactions between the first device 104, the second device 106, and the transcription system 108 may occur over a first network (e.g., the network 102 of FIG. 1). Generally, the operations 300 may relate to presentation of communications between the first device 104 and the second device 106. The operations 300 illustrated are not exhaustive but are merely representative of operations 300 that may occur. Furthermore, one operation as illustrated may represent one or more communications, operations, and/or data exchanges.

At operation 302, a communication session may be established between the first device 104 and the second device 106. During the communication session, audio obtained by the second device 106 may be directed to the first device 104. Alternately or additionally, audio obtained by the first device 104 may be directed to the second device 106. Alternately or additionally, text typed into the second device 106 may be presented on the first device 104. Alternately or additionally, text typed into the first device 104 may be presented on the second device 106.

At operation 304, the second device 106 may direct audio (e.g., including words spoken by a hearing user) to the first device 104. The second device 106 may direct audio to the first device 104 using the network and the communication protocols for the communication session that were established during the operation 302.

At operation 306, the first device 104 may be configured to audibly broadcast the audio of the communication session, such as on the speaker 120 of the first device 104.

At operation 308, the first device 104 may be configured to direct the audio to the transcription system 108. The first device 104 may direct the audio to the transcription system 108 based on a transcription system protocol included in the first device 104. In these and other embodiments, the first device 104 may be elected to send the audio to the transcription system 108 based on the first device 104 being associated with the transcription system 108. To direct the audio to the transcription system 108, the first device 104 may establish a network connection with the transcription system 108 using networking protocols, passwords, or other procedures to establish the network connection. After establishing a network connection, a transcription session may be established by the transcription system 108 to generate a transcription of the audio. The transcription session may be between the first device 104 and the transcription system 108.

At operation 310, the transcription system 108 may transcribe the audio. This transcription of the audio may be accomplished using a human assistant (e.g., the human assistant 114).

At operation 312, the transcription system 108 may direct the transcription of the audio generated by the transcription session to the first device 104. The transcription may be directed using the network and the communication protocols for the transcription session that were established during the operation 308.

At operation 314, the first device 104 may be configured to display the transcription, such as on the visual display 116 of the first device 104. The first device 104 may be configured to display the transcription in substantially real-time or real-time in configuration with audibly broadcasting the remote audio in operation 306. In this manner, the hearing-impaired user 110 may simultaneously (or nearly simultaneously) hear words spoken by the hearing user 112 as well as read captions of the words spoken by the hearing user 112. In some embodiments, the transcription may be displayed with an indicator (e.g., the indicator 206) that indicates that the received text was spoken by the hearing user 112.

At operation 316, the second device 106 may direct typed text to the first device 104. The second device 106 may direct the typed text to the first device 104 using the network and the communication protocols for the communication session that were established during the operation 302. The text may be typed via a touchscreen, a physical keyboard, handwriting recognition, or some form of touchscreen-based swipe keyboard. For example, where the second device 106 is a smartphone device, the text may be typed by the hearing user 112 into a captioning app via the touchscreen display 124 of the smartphone device. In another example, where the second device 106 is a VoIP telephone device, the text may be typed by the hearing user 112 into a captioning app via a display of the VoIP telephone device. In another example, where the second device 106 is a DTMF telephone device, the text may be typed by the hearing user 112 into a telephone keypad of the DTMF telephone device, and then converted into a DTMF signal that can be decoded by the first device 104. In another example, where the second device 106 is a desktop computer, the text may be typed by the hearing user 112 via a keyboard of the desktop computer into webpage in a browser on a display of the desktop computer.

At operation 318, the first device 104 may be configured to present the typed text on the first device 104, such as on the visual display 116 of the first device 104. In some embodiments, the typed text may be displayed with an indicator (e.g., the indicator 208) that indicates that the typed text was typed by the hearing user 112.

At operation 320, the first device 104 may be configured to direct the typed text to the transcription system 108. The first device 104 may direct the typed text to the transcription system 108 based on a transcription system protocol included in the first device 104 over the transcription session established during the operation 308.

At operation 322, the transcription system 108 may be configured to present the typed text on a display of a computing device of a human assistant (e.g., the human assistant 114 of FIG. 1). This typed text may be presented to the human assistant 114 to enable the human assistant 114 to more easily follow the conversation, which may enable the human assistant 114 to more accurately transcribe spoken words that follow the typed text.

At operation 324, the first device 104 may direct audio (e.g., including words spoken by the hearing-impaired user 110) to the second device 106. The first device 104 may direct audio to the second device 106 using the network and the communication protocols for the communication session that were established during the operation 302.

At operation 326, the second device 106 may be configured to audibly broadcast the audio of the communication session on the second device 106, such as on the speaker 126 of the second device 106.

At operation 328, the first device 104 may direct typed text to the second device 106. The first device 104 may direct the typed text to the second device 106 using the network and the communication protocols for the communication session that were established during the operation 302. For example, the text may be typed by the hearing-impaired user 110 into the physical keypad 118 of the first device 104, or may be type into a digital keypad presented on the visual display 116 of the first device 104.

At operation 330, the second device 106 may be configured to present the typed text on the second device 106, such as on the touchscreen display 124 via a captioning app of the second device 106. For example, where the second device 106 is a smartphone device, the typed text may be presented on captioning app on the touchscreen display 124 of the smartphone device. In another example, where the second device 106 is a VoIP telephone device, the typed text may be presented in captioning app on a display of the VoIP telephone device. In another example, where the second device 106 is a DTMF telephone device, the type text may be converted into audio using a text-to-speech conversion, and then broadcast on a speaker of the DTMF telephone device. The text-to-speech conversion may operate in word mode where words are articulated or character mode where individual characters are articulated, which may be useful for spelling, providing numerical data, or articulate characters of words that are difficult to pronunciate. In another example, where the second device 106 is a desktop computer, the typed text may be presented in a webpage in a browser on a display of the desktop computer.

Modifications, additions, or omissions may be made to the operations 300 without departing from the scope of the present disclosure. For example, the operations 300 may not include the operations 320 and 322 in some embodiments. As another example, the operations 300 may not include the operations 324, 326, 328, and 330 in some embodiments. Further, in some embodiments the operations 300 may be arranged in a different order or performed at the same time. For example, the operations 316 and 318 may occur before the operations 304, 306, 308, 310, and 312. Alternately or additionally, the operations 316 and 318 may occur at the same time or in substantially overlapping time periods as the operations 304, 306, 308, 310, and 312.

Figure 4:
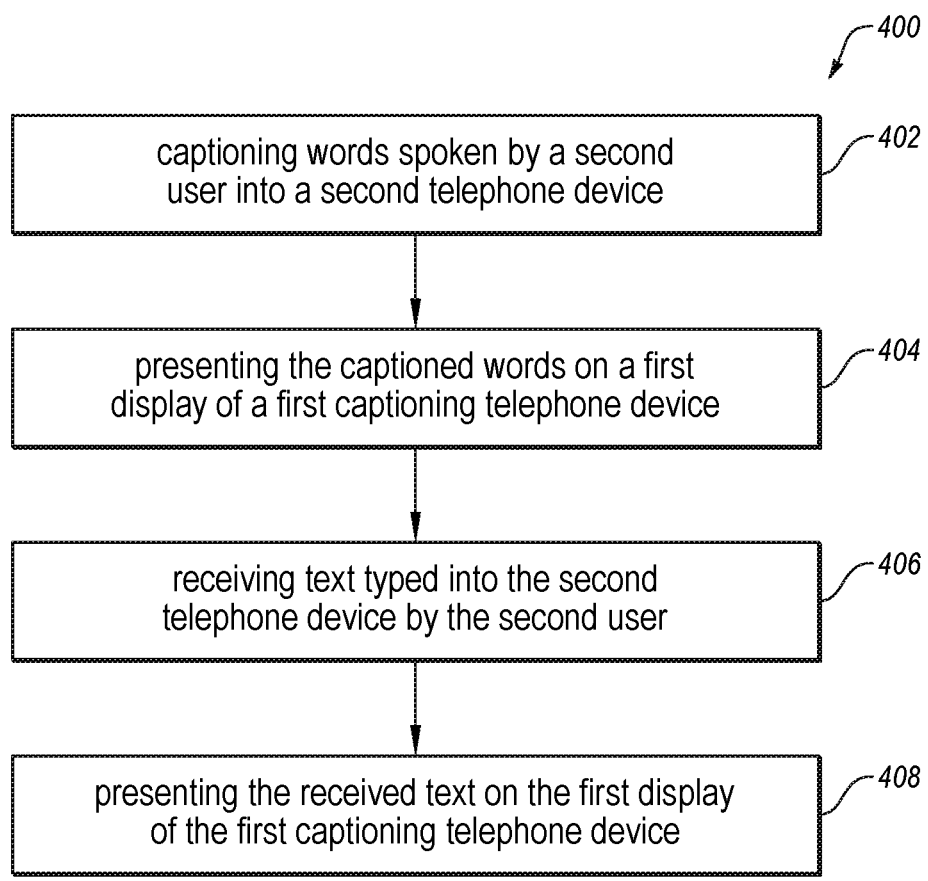
FIG. 4 illustrates a flowchart of an example method to present communications.

FIG. 4 illustrates a flowchart of an example method 400 to present communications. The method 400 may be arranged in accordance with at least one embodiment described in the present disclosure. One or more operations of the method 400 may be performed, in some embodiments, by a device or system, such as the first device 104 or the second device 106 of FIG. 1 or the system 500 of FIG. 5 or another device, combination of devices, or system. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 400 may include, at block 402, captioning words spoken by a second user into a second telephone device. In some embodiments, the captioning may be performed by a human assistant. In some embodiments, the captioning may be performed during a call between a first user using a first captioning telephone device and the second user using the second telephone device. In some embodiments, the first user may be a hearing-impaired user. In some embodiments, the second user may be a hearing user.

The method 400 may include, at block 404, presenting the captioned words on a first display of a first captioning telephone device.

The method 400 may include, at block 406, receiving text typed into the second telephone device by the second user.

The method 400 may include, at block 408, presenting the received text on the first display of the first captioning telephone device. In some embodiments, the presenting of the received text on the first display of the first captioning telephone device may include presenting the received text on the first display of the first captioning telephone device with a first indicator that indicates that the received text was typed by the second user. In some embodiments, the presenting of the captioned words on the first display of the first captioning telephone device may include presenting the captioned words on the first display of the first captioning telephone device with a second indicator that indicates that the captioned words were spoken by the second user.

In some embodiments, the second telephone device may include a smartphone device having a touchscreen display and running a captioning app. In some embodiments, the text typed into the smartphone device may include text typed into the captioning app via the touchscreen display. In some embodiments, the method 400 may also include receiving second text typed into the first captioning telephone device by the first user, and presenting the second text in the captioning app on the touchscreen display of the smartphone device.

In some embodiments, the second telephone device the second telephone device may include a VoIP telephone device having a second display and running a captioning app. In some embodiments, the text typed into the VoIP telephone device may include text typed into the captioning app. In some embodiments, the method 400 may further include receiving second text typed into the first captioning telephone device by the first user, and presenting the received second text in the captioning app on the second display of the VoIP telephone device.

In some embodiments, the second telephone device may include a DTMF telephone device including a telephone keypad and a speaker. In some embodiments, the text typed into the DTMF telephone device by the second user may include text typed into the telephone keypad. In some embodiments, the method 400 may further include receiving second text typed into the first captioning telephone device by the first user, converting the second text into audio using a text-to-speech conversion, and sending the audio to the speaker of the DTMF telephone device.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. For example, in some embodiments, the method 400 may further include presenting the received text on a display of a computing device of the human assistant.

Figure 5:
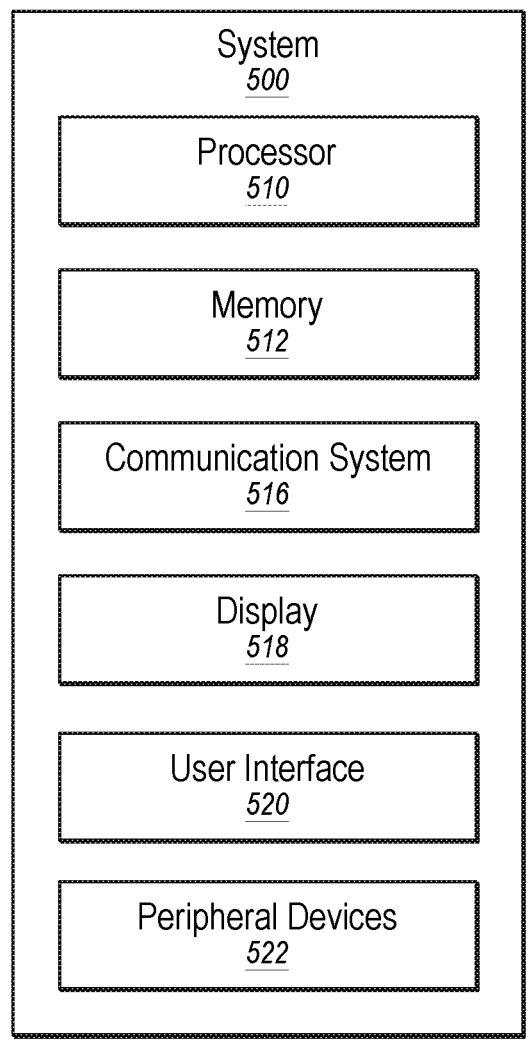
FIG. 5 illustrates an example system that may be used during presentation of communications.

FIG. 5 illustrates an example system 500 that may be used during transcription of communications. The system 500 may be arranged in accordance with at least one embodiment described in the present disclosure. The system 500 may include a processor 510, memory 512, a communication system 516, a display 518, a user interface 520, and a peripheral device 522, which all may be communicatively coupled. In some embodiments, the system 500 may be part of any of the systems or devices described in this disclosure.

For example, the system 500 may be part of the first device 104 of FIG. 1 and may be configured to perform one or more of the tasks described above with respect to the first device 104. As another example, the system 500 may be part of the second device 106 of FIG. 1 and may be configured to perform one or more of the tasks described above with respect to the second device 106. As another example, the system 500 may be part of the transcription system 108 of FIG. 1 and may be configured to perform one or more of the tasks described above with respect to the transcription system 108.

Generally, the processor 510 may include any suitable special-purpose or general-purpose computer, computing entity, or processing device including various computer hardware or software modules and may be configured to execute instructions stored on any applicable computer-readable storage media. For example, the processor 510 may include a microprocessor, a microcontroller, a parallel processor such as a graphics processing unit (GPU) or tensor processing unit (TPU), a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 5, it is understood that the processor 510 may include any number of processors distributed across any number of networks or physical locations that are configured to perform individually or collectively any number of operations described herein. In some embodiments, the processor 510 may interpret and/or execute program instructions and/or process data stored in the memory 512. In some embodiments, the processor 510 may execute the program instructions stored in the memory 512.

For example, in some embodiments, the processor 510 may execute program instructions stored in the memory 512 that are related to transcription of communications such that the system 500 may perform or direct the performance of the operations associated therewith as directed by the instructions. In these and other embodiments, the instructions may be used to perform one or more operations 300 of the FIG. 3 or the method 400 of FIG. 4.

The memory 512 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 510.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media.

Computer-executable instructions may include, for example, instructions and data configured to cause the processor 510 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of *In re Nuuten*, 500 F.3d 1346 (Fed. Cir. 2007). Combinations of the above may also be included within the scope of computer-readable media.

The communication system 516 may include any component, device, system, or combination thereof that is configured to transmit or receive information over a network. In some embodiments, the communication system 516 may communicate with other devices at other locations, the same location, or even other components within the same system. For example, the communication system 516 may include a modem, a network card (wireless or wired), an infrared communication device, a wireless communication device (such as an antenna), and/or chipset (such as a Bluetooth® device, an 802.6 device (e.g., Metropolitan Area Network (MAN)), a WiFi device, a WiMax device, cellular communication facilities, etc.), and/or the like. The communication system 516 may permit data to be exchanged with a network and/or any other devices or systems described in the present disclosure. For example, when the system 500 is included in the first device 104 of FIG. 1, the communication system 516 may allow the first device 104 to communicate with the transcription system 108.

The display 518 may be configured as one or more displays, like an LCD, LED, Braille terminal, or other type of display. The display 518 may be configured to present video, text captions, user interfaces, and other data as directed by the processor 510. For example, when the system 500 is included in the first device 104 of FIG. 1, the display 518 may be configured to present a transcription of second audio from the second device 106.

The user interface 520 may include any device to allow a user to interface with the system 500. For example, the user interface 520 may include a mouse, a track pad, a keyboard, buttons, camera, and/or a touchscreen, among other devices. The user interface 520 may receive input from a user and provide the input to the processor 510. In some embodiments, the user interface 520 and the display 518 may be combined.

The peripheral devices 522 may include one or more devices. For example, the peripheral devices may include a microphone, an imager, and/or a speaker, among other peripheral devices. In these and other embodiments, the microphone may be configured to capture audio. The imager may be configured to capture images. The images may be captured in a manner to produce video or image data. In some embodiments, the speaker may broadcast audio received by the system 500 or otherwise generated by the system 500.

Modifications, additions, or omissions may be made to the system 500 without departing from the scope of the present disclosure. For example, in some embodiments, the system 500 may include any number of other components that may not be explicitly illustrated or described. Further, depending on certain implementations, the system 500 may not include one or more of the components illustrated and described.

As indicated above, the embodiments described herein may include the use of a special purpose or general-purpose computer (e.g., the processor 510 of FIG. 5) including various computer hardware or software modules, as discussed in greater detail below. Further, as indicated above, embodiments described herein may be implemented using computer-readable media (e.g., the memory 512 of FIG. 5) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

The invention claimed is:

1. A method to present communications, the method comprising:

captioning, by a transcription system during a call between a first user using a first captioning telephone device and a second user using a second telephone device, words in audio spoken by the second user into the second telephone device, the captioning involving a human assistant;

presenting the captioned words on a first display of the first captioning telephone device with a first indicator that indicates that the captioned words were spoken by the second user;

receiving text typed into the second telephone device by the second user; and presenting the received text on the first display of the first captioning telephone device with a second indicator that indicates that the received text was typed by the second user.

2. The method of claim 1, wherein:
the first user is a hearing-impaired user; and
the second user is a hearing user.

3. The method of claim 1, wherein:
the second telephone device comprises a smartphone device having a touchscreen display and running a captioning app; and
the text typed into the smartphone device comprises text typed into the captioning app via the touchscreen display.

4. The method of claim 3, further comprising:
receiving second text typed into the first captioning telephone device by the first user; and
presenting the second text in the captioning app on the touchscreen display of the smartphone device.

5. The method of claim 1, wherein:
the second telephone device comprises a Voice-over-IP (VoIP) telephone device having a second display and running a captioning app; and
the text typed into the VoIP telephone device comprises text typed into the captioning app.

6. The method of claim 5, further comprising:
receiving second text typed into the first captioning telephone device by the first user; and
presenting the received second text in the captioning app on the second display of the VoIP telephone device.

7. The method of claim 1, wherein:
the second telephone device comprises a dual-tone multi-frequency signaling (DTMF) telephone device including a telephone keypad and a speaker; and
the text typed into the DTMF telephone device by the second user comprises text typed into the telephone keypad.

8. The method of claim 7, further comprising:
receiving second text typed into the first captioning telephone device by the first user;
converting the second text into second audio using a text-to-speech conversion; and
sending the second audio to the speaker of the DTMF telephone device.

9. The method of claim 1, further comprising:
presenting the received text on a display of a computing device of the human assistant.

10. At least one non-transitory computer-readable media configured to store one or more instructions that in response to being executed by at least one computing system cause performance of the method of claim 1.

11. A captioning telephone device comprising:
a display;
a speaker;
a processor communicatively coupled to the display and to the speaker; and
at least one non-transitory computer-readable media communicatively coupled to the processor and configured to store one or more instructions that, when executed by the processor, cause the captioning telephone device to perform operations comprising:
receiving, from a transcription system during a call between a first user using the captioning telephone device and a second user using a second telephone device, captions of words in audio spoken by the second user into the second telephone device, the generation of captions by the transcription system involving a human assistant;
presenting the captioned words on the display with a first indicator that indicates that the captioned words were spoken by the second user;
receiving text typed into the second telephone device by the second user; and
presenting the received text on the display with a second indicator that indicates that the received text was typed by the second user.

12. The captioning telephone device of claim 11, wherein:
the first user is a hearing-impaired user; and
the second user is a hearing user.

13. The captioning telephone device of claim 11, wherein:
the second telephone device comprises a smartphone device having a touchscreen display and running a captioning app; and
the text typed into the smartphone device comprises text typed into the captioning app via the touchscreen display.

14. The captioning telephone device of claim 13, wherein:
the captioning telephone device further comprises a telephone keypad;
the operations further comprise receiving second text typed into the telephone keypad of the captioning telephone device by the first user; and
the operations further comprise sending the second text for presentation in the captioning app on the touchscreen display of the smartphone device.

15. The captioning telephone device of claim 11, wherein:
the second telephone device comprises a Voice-over-IP (VoIP) telephone device having a second display and running a captioning app; and
the text typed into the VoIP telephone device comprises text typed into the captioning app.

16. The captioning telephone device of claim 15, wherein the operations further comprise:
receiving second text typed into the captioning telephone device by the first user; and
sending the second text for presentation in the captioning app on the second display of the VoIP telephone device.

17. The captioning telephone device of claim 11, wherein:
the second telephone device comprises a dual-tone multi-frequency signaling (DTMF) telephone device including a telephone keypad and a second speaker; and
the text typed into the DTMF telephone device by the second user comprises text typed into the telephone keypad.

18. The captioning telephone device of claim 17, further comprising:
receiving second text typed into the captioning telephone device by the first user;
converting the second text into audio using a text-to-speech conversion; and
sending the audio to the second speaker of the DTMF telephone device.

19. A method to present communications, the method comprising:
obtaining, from a transcription system, a transcription of audio spoken by a first user into a first device during a communication session between the first user using the first device and a second user using a second device;
presenting the transcription on a display of the first device with a first indicator that indicates that the transcription was spoken by the second user;
obtaining text typed into the second device by the second user; and presenting the obtained text on the display of the first device with a second indicator that indicates that the obtained text was typed by the second user.

20. The method of claim 19, further comprising directing the obtained text from the second device to the transcription system.

\* \* \* \* \*